United States Patent [19]
Klemt

[11] 3,790,955
[45] Feb. 5, 1974

[54] RASTER PROCESS FOR CLASSIFYING CHARACTERS

[75] Inventor: Arthur Klemt, Schwalbeneck, Germany

[73] Assignee: Arthur Klemt Kommanditgesellschaft, Schwalbeneck, Germany

[22] Filed: May 25, 1971

[21] Appl. No.: 146,677

[30] Foreign Application Priority Data

May 27, 1970 Germany .................. P 20 26 033.7

[52] U.S. Cl. ............. 340/146.3 MA, 340/146.3 AQ
[51] Int. Cl. .......................... G06k 9/06, G06k 9/10
[58] Field of Search .....340/146.3, 146.3 MA, 146.3 AQ 340/146.3 AG

[56] References Cited

UNITED STATES PATENTS

| | | | |
|---|---|---|---|
| 3,104,369 | 9/1963 | Rabinaw et al. | 340/146.3 MA |
| 3,588,821 | 6/1971 | LaSalle | 340/146.3 AG |
| 3,192,505 | 6/1965 | Rosenblatt | 340/146.3 AG |

*Primary Examiner*—Paul J. Henon
*Assistant Examiner*—Joseph M. Thesz, Jr.
*Attorney, Agent, or Firm*—Marn & Jangarathis; Louis E. Marn; James C. Jangarathis

[57] ABSTRACT

A raster process for classifying presented characters into m classes, the features of each character in a class being variable, is disclosed in accordance with the teachings of the present invention. A character to be classified is imaged onto a raster field having n raster points. Electrical voltages are derived from each raster point and are selectively supplied to no more than n independent resistance networks for each of said m classes. Each resistance network responds to the electrical voltages selectively supplied thereto to produce an output voltage representative of a form part of the character of a class. Said form part is selectively comprised of selected areas of said raster field which should remain darkened for a character of said class, selected areas of said raster field which should remain light for a character of said class, or two selected raster field areas which should exhibit approximately equal degree of darkened areas or lightened areas for a character of said class. The output voltage produced by each resistance network is compared to a threshold level associated with said class. If the output voltage produced by each resistance network in a class is below said threshold level, the presented character is classified as belonging to said class.

4 Claims, 4 Drawing Figures

Inventor:

Inventor:

RASTER PROCESS FOR CLASSIFYING CHARACTERS

This invention relates to a raster process for classifying characters, the features of which vary, into m classes, in which the characters are imaged onto n raster points on a raster field, an electrical voltage is derived from each raster point and the n electrical voltages obtained are fed to resistance networks and are used therein for forming combinations.

In the automatic classification of characters, there are, as a rule, no characters at one's disposal the shape, position and blackening of which are the same for each representative of each character class; instead there are characters which can be produced by rapid printing, typewriting or other printing machinery or which are written by hand. The representatives of such a character class show numerous variations with respect to blackening and position on a support surface which can result from the type of printing machine, the typewriter ribbon, the paper and printing quality, type distortion and height adjustment. In hand written letters there are, furthermore, differences in shapes and contours since the handwriting of various persons, and even characters of the same class which are written by one and the same person, can be very different.

In the automatic classification of characters therefore representatives must be classified, the features of which show substantial variation. For this there are today two basically different processes available, namely the contour following process and the raster process. In both these types of process the previously known embodiments for effecting them have been very cumbersome. In the interest of brevity, the contour following process will not be described in detail herein since the present invention is exclusively concerned with a raster process, but with one which requires a substantially smaller technical outlay than previous raster processes.

The following observations are particularly applicable to the automatic classification of numbers since at the present this is the most important area of use; however, the same basic principles are of course involved in the classification of other characters. In the known raster process the particular character to be classified is broken down on a raster field which consists of several hundred raster points. Normally there are at least about 300 raster points in the raster field. These are necessary for the classification of letters; although many of the known raster processes use up to 800 raster points. The electrical voltages generated by the breaking down of the character to be classified in the raster points, (with n raster points there are n electrical voltages, of which each is proportional to the blackening of the respective raster point) are led to the input of parallel connected resistance networks. Linear resistance networks are used in general in the form of a bridge circuit with film resistors. In these resistance networks, by corresponding combinations of resistances, the features of a representative number of the characters to be determined are stored. Thus, in the case of classifying numbers, a sufficient number of representatives of the number 0, a sufficient number representatives of number 1, etc., up to a sufficient number of representatives of number 9 are stored. In the resistance networks, the electrical voltages coming from the raster points, i.e., the features presented by the character to be classified, are compared with the features of the stored representatives. The output signal formed as a result of this comparison from the resistance network is fed to an OR gate which then gives a YES classification if one or more of the resistance networks of one class produces an output signal. A YES classification is to be understood as indicating that the character to be classified belongs to one of the m classes. Correspondingly, it is to be understood that a NO classification indicates that the character does not belong to one of the m classes; this takes place if none of the resistance networks provides an output signal. If for example, a numeral "1" which is present results in raster point voltages which correspond to the features of one of the stored representatives of the numeral "1", then the resistance network in which the features of this representative of numeral "1" are stored produces an output signal and the character present is classified as "1". Optionally, one or more further resistance networks for the character "1", in which sufficient similar representatives of the numeral "1" are stored, can likewise produce a YES classification and it remains in such a case that the character presented belongs to the class of "1". All networks of the class "1" in which the features of sufficiently differing representatives of the numeral "1" are stored, and all networks of other classes, in which there are thus stored representatives of numbers different from "1", produce no output signal. In these networks there thus results a NO classification.

In this sort of raster process for the classification of characters, it is necessary that for each representative *p* of each character class *m*, a special resistance network to which the *n* electrical voltages of the raster field are led must be provided. Thus, a total of $p \times m$ resistance networks are required. Unless further measures are taken, this process is only usable for the classification of nearly ideal characters, which can seldom be guaranteed in practice. In most cases, e.g., in the classification of hand written characters or characters printed by typewriter or high speed printing machine of some sort, there is so large a number of representatives *p* with substantial variations of their features in each of the character classes *m*, that for a usable classification an unbearably large number of resistance networks would be necessary, e.g. 1,000 networks for each class of character. For the classifying of representatives of numerals 0–9, there would thus be required 10,000 resistance networks. This leads to the fact that simple raster processes for classifying characters with substantial variation in their feature is rendered impractical because of the amount of apparatus necessary.

In order to be able to use raster processes for the classifying of characters with many variants overall, the process was developed in which instead of the individual features of the representatives, average values of the features used for distinguishing characters were stored. In this tolerances are allowed in the recognition process so that the resistance network does not store a single representative but a group of representatives, the features of which show variations within given tolerances. These tolerances must however be small, with the result that a great number of resistance networks is still necessary in order to store representative characters with substantial variations in their features.

Further known processes make use of the so called "optimisation." This utilizes the fact that in the various representatives of a class of characters (still so long only as no great variations of the features are present) there are raster points which are always white, and some which are always black, and these only are used for the evaluation. Raster points which for each representative of the class can be sometimes black and sometimes white, between particular blackening degrees, are not included in the evaluation. By means of the omission of raster points which can be black or white for characters of a class, valuable features are thrown away for recognizing and for separating the characters, i.e., the surety against false classification drops. These processes do indeed reduce the demand for resistance networks, but even then not to the required degree; but on the other hand they require additional technical devices for the optimisation, so that the total demand in materials is likewise extremely great. Quite apart from this the discrimination leaves something to be desired.

This last also goes for the process with the formation of an average value. If one allows too great variations of the features of the representatives in the average value formation or in the optimisation, the discrimination between the characters to be classified compared to other characters and foreign characters drops substantially. Thus, for example, with insufficient discrimination, representatives of the number "1" are classified in the class of numeral "7" and vice versa.

It is an object of the present invention to provide a raster process for the automatic classification of characters, which requires substantially less equipment than previously known raster processes, but which allows nevertheless the classification of characters the features of which are subject to substantial variation, for example hand written characters, which guarantees great discrimination in classification relative to representatives of other classes, and which is insensitive to disturbances, e.g., alterations in blackening, breaking of contours, different height position of the character, spots on the paper and the like.

This object is achieved by the process of the invention, in which from a raster field which is only very coarsely divided compared to the known raster fields, e.g., one with 24 raster points, only a correspondingly small number of electrical voltages are generated, and working with these voltages, in a very much smaller quantity of resistance networks than those used in the known classifiers, not individual features of the total character but characteristic parts of the total shape of the character, hereafter denoted as form parts, are used for the classification by comparison of these form parts with corresponding form parts of stored representatives, a YES classification being accomplished only if the output signals of all the resistance networks of one class correspond to a YES classification.

BRIEF SUMMARY OF THE INVENTION

Accordingly, the present invention provides a raster process for classifying characters the features of which may vary, into m classes, in which process the characters to be classified are imaged onto a raster field having n raster points, from each raster points there is derived an electrical voltage, and the obtained n electrical voltages are fed to resistance networks and are used therein for forming combinations, which is characterized by feeding the *n* electrical voltages derived from the raster points, for each of said m classes, to *n* or fewer than n mutually independent resistance networks, combining in each of these resistance networks of a class the electrical voltages from such raster points, which together correspond to characteristic form parts of characters of this class, i.e., either form parts made up form darkened areas of the raster field, or form parts made up from light-remaining areas of the raster field, or form parts each made up from two raster field areas of equal or approximately equal degree of darkening or lightening, respectively, to produce an output voltage, and determining whether the output voltage of each resistance network stays below a bound relevant for the class to be identified.

Preferably, for the determination of whether the output voltage falls within the predetermined limits for each resistance network for the class to be identified, the output voltage of each resistance network is compared with a voltage which is proportional or approximately proportional to the sum of all the n electrical voltages derived from the raster points.

Preferably the output voltage of each resistance network is fed via a regulator. Preferably also the voltage which is proportional or approximately proportional to the sum of all the n electrical voltages derived from the raster points, is fed via a regulator.

In the process of the invention use is made of characteristic form parts of the characters for classification. In this connection, three types of form parts are distinguished. In imaging a character onto a raster field there results:

1. regions of the raster field which are blackened
2. regions of the raster field which are not blackened, i.e. remain light, and
3. regions of the raster field which have the same or approximately the same blackening or lightening as another raster field region. All three types of form parts are used for classification.

In a classification on the basis of these form parts, even comparatively few form parts suffice for a positive differentiation of characters in question, even with substantial variations in their features, as are present in hand written figures. Since for each form part a resistance network is necessary, only a few resistance networks are needed. For the classification of hand written figures only about 12 to 24 resistance networks per class are necessary. At maximum, only as many form parts are formed per class, and therefore, only as many resistance networks are provided, as there are raster points used, and thereby electrical input voltages generated. The number of resistance networks is thus, in clear contrast to prior art raster process character classifying devices, totally independent of the number of representatives taken into account for the classification.

In the classification according to the invention on the basis of form parts of the characters, by comparison with the form parts stored in the resistance networks, substantially greater degrees of variation between representatives of a class can be permitted without loss of discrimination relative to concurrent classes, so that one can work with a substantially coarser rastering of the raster field.

Thus, for example, for the classification of hand written figures 0 . . 9 in the known process 300–800 raster points are needed, while the process according to the invention requires only 24 raster points. Naturally one can use more than 24 raster points, e.g. a raster field of 5 by 7, i.e. 35 raster points, but it is not necessary. Even then the number of raster points is smaller by at least one degree of magnitude than in the known process.

Thus, relative to the rastering and relative also to the number of resistance networks necessary (as noted above, this number is independent of the number of representatives with varying features per class and, at maximum, only so many resistance networks are required as raster points used), the process of the invention requires substantially less components than previously known raster processes. The difference in outlay is next illustrated by the following description for the classification of hand written figures 0 . . . 9. There thus results a classification into ten classes ($m$=10) wherein it is taken that, for the classification, 100 representative groups per class (p-100) are taken into account and their features must be stored. The number of one hundred representative groups per class is, under practical conditions,not in any way considered high.

| | Known process | Process of the invention |
|---|---|---|
| Number of networks | $p\times m=100\times10=1000$ | maximum $n\times m=24\times10=240$ average about 15 $15\times10-150$ |
| Number of raster points | 300–800 | 24 |

The process according to the invention is thus effected both with a fraction of the resistance networks and a fraction of the raster points of known raster processes.

BRIEF DESCRIPTION OF THE DRAWINGS

The invention is further described in connection with the accompanying drawings in which.

DETAILED DESCRIPTION

Figure 1:
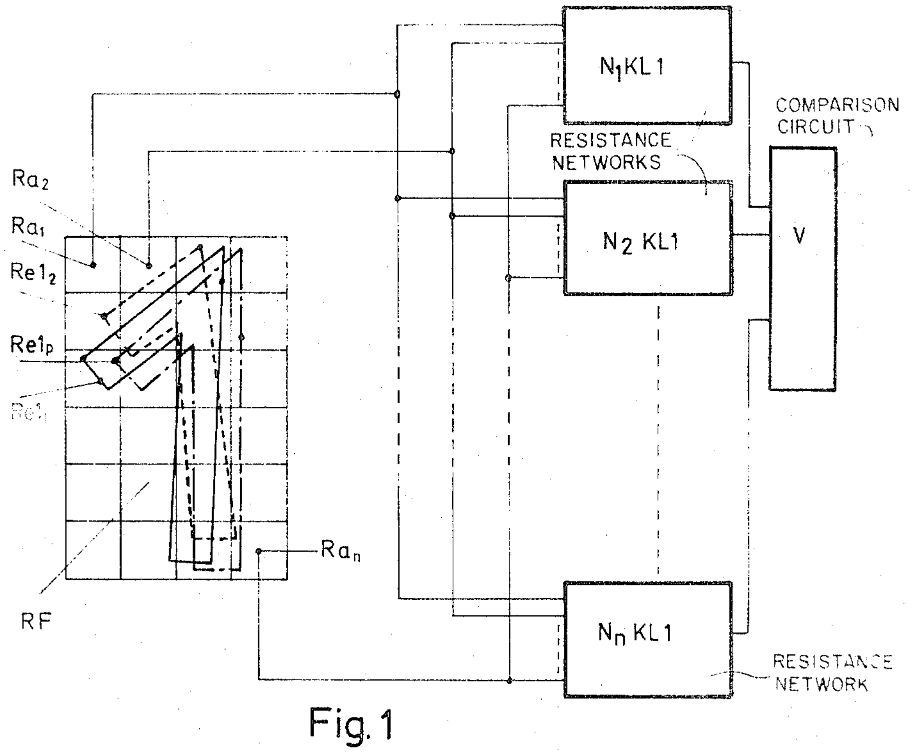
FIG. 1 shows the arrangement for carrying out the process according to the invention.

According to FIG. 1, a raster field RF is illustrated with n raster points $Ra_1$, $Ra_2$, . . . $Ra_n$. In the present case there is a raster field with 24 raster points. The character to be classified is imaged onto the raster field. As an example, three representatives of the number 1 are illustrated in superimposed drawing, one representative $RE1_1$ in continuous lines, one representative $RE1_2$ in dashed lines and one representative $Re1_p$ in dashed dot lines. Naturally in classification, only one representative is imaged at any one time.

The n electrical voltages generated in the raster points $Ra_1$, $Ra_2$ . . . $Ra_n$ of the raster field RF by the representative present are led to parallel connected inputs for resistance networks are are processed therein for forming combinations. For each character class at most $n$ resistance networks are connected to the raster field. For simplification in FIG. 1 only the resistance networks of class 1, i.e., $N_1KL1$, $N_2KL1$ . . . $N_nKL1$ are illustrated. While in known raster processes, for each representative to be classified or each representative group to be classified there is necessary a special resistance network, in which the features of this representative or of this representative group are stored, in accordance with the present invention, the n raster point voltages possible representatives of a class in the classification. In each of the individual resistance networks, not all of the raster points are combined with one another, but only those which are important for the recognition of form parts of the characters. Thus not all raster point values are supplied to each input of the resistance networks; but to the individual resistance networks there are led only the electrical voltages of such raster points which, taken together, correspond to a characteristic form part of the character of the class. Thus the electrical voltages of such raster points are led to certain resistance networks, which, for representatives of the class in question, are usually blackened, wherein only a part of the character is abstracted, e.g., only the upstroke of a "1", only the upper horizontal stroke of a numeral "7", only the lower horizontal stroke of a number "2" and the like. To other resistance networks, for improving the discrimination relative to concurrent classes, the electrical voltages are fed from only those raster points or raster point groups which cannot be blackened by the character to be classified; in the example of numeral "1", e.g. of the raster point at the far left top, or the group of raster points at the lower left in the raster field are not blackened. This raster point or raster point group is however blackened or at least partly blackened by the concurrent character of numeral "7" so that a differentiation between the numeral "1" and the numeral "7" results. If in these raster points or raster point regions a blackening is determined, this shows that the figure in question cannot be "1" since as already noted, it is necessary in the process of the invention for classifying the character in question that the output signals of all resistance networks of a class must lie within a certain boundary. This is, however, not the case. To a third group of resistance networks the electrical voltages are fed from such raster points or groups of raster points which for the character to be classified must have the same or substantially the same blackening values. For example for the numeral "8" raster points corresponding to one another or raster point groups corresponding to one another on the left hand side and on the right hand side of the raster field have substantially the same blackening values. In the otherwise considerably similar numeral "3" there is not present any such blackening equivalence on the left and right sides. Similar conditions are given by all characters. By this leading of voltages of raster points or raster point groups of equal blackening, the discrimination in the classification is substantially increased. This is further described in detail subsequently with reference to the numeral "1".

In the resistance networks the raster point voltages corresponding to the form parts of the character are combined with one another, so that for each resistance network an output voltage results. If this output voltage lies, for the resistance network in question, i.e., for the form part of the character to be identified, within the boundaries given for the form part to be identified, then the form part in question is classified with YES; if the output voltages of all resistance networks of the class lie within the boundaries given for the class to be identified, then all the form parts of a character present are then classified with YES, so that the character in question is classified with YES as a whole for this class. For the determination of whether all output voltages of the resistance networks of a class lie within the predetermined boundaries, these output voltages are fed into a comparison device V, in which the output voltages are compared with preset comparison voltages.

As is further described herein a comparison voltage is suitably used which is proportional or approximately proportional to the sum of all the n electrical voltages derived from the raster points $Ra_1 \ldots Ra_n$.

Thus, compared to known raster processes the process of the invention is distinguished by the following main differences and advantages:

1. The process according to the invention requires for each class, independently of the number of representatives with differing features, only at most as many networks as there are raster points present, whereas the prior art raster process requires as many networks for each class as there are representatives or representative groups of this class to be classified. In the classification of the representatives with substantial variations, as is the case with the already noted written letters, particularly hand written letters, the process according to the invention thus requires only a fraction, about 10–20 percent, of the networks required by the prior art raster process.

2. As opposed to prior art raster processes, the process according to the invention works with a very coarse rastering of the character field. For classifying the initially noted characters with substantial variations in their features, the prior art raster process requires 300–800 raster points, while the process according to the invention can use 24 raster points.

3. In the prior art raster process a YES classification is obtained if one network of one class decides with YES, while in the process according to the invention a YES classification is only given when all networks of a class decide YES. By this the discriminating characteristics relative to concurrent characters and foreign characters is substantially higher than that of the known processes.

The process according to the invention is, by way of example, further described with reference to example of classifying representatives of numeral "1" in connection with the accompanying FIG. 2.

EXAMPLE

Figure 2:
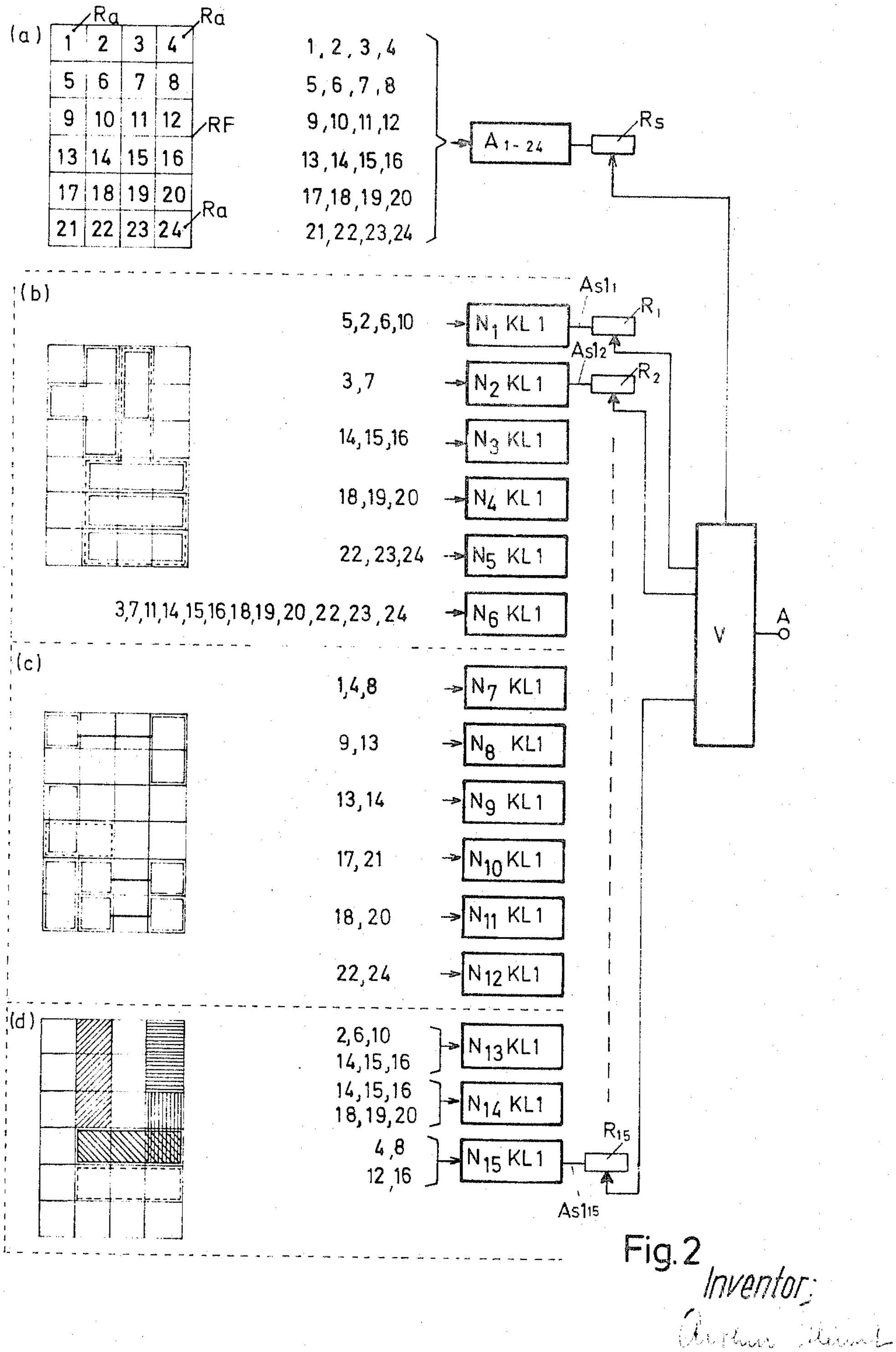
FIG. 2 illustrates the form parts used of the letters and their handling in the resistance networks with, as example, the classification of representatives of the number "1".

The number "1", the features of which undergo substantial variations from one representative to another, for example various numerals "1" according to the illustration in the raster field of FIG. 1, are imaged onto a raster field consisting of raster points 1—24 according to section (a) of FIG. 2. For simplification, in section (a) of FIG. 2 the raster points are denoted merely by the corresponding numbers. Naturally always only one representative is imaged onto the rastr field at any one time.

The blackenings present on raster points 1 . . . . 24 corresponding to the number 1 are transformed into electrical voltages and fed to networks $N_1$KL1 . . . $N_{15}$KL1. Despite the substantial variation with the representatives, as illustrated for example in FIG. 1, in contrast to the prior art raster process only 24 raster points are required and thereby, at most 24 networks per class. In the embodiment shown in FIG. 2, for the classification of class "1" only 15 networks are provided, and this number, which lies substantially under *n*=24, of networks is fully sufficient for a satisfactory and trouble free classification. About this same number of networks are, on the average, required for the other numerals.

As already noted, one can differentiate between three types of form parts of the characters, these are form parts of the blackened portions of the raster field, form parts of light-remaining parts of the raster field, and form parts of two raster field regions each of equal or substantially equal blackening. These three form part groups are represented in FIG. 2 by sections (*b*), (*c*) and (*d*). To each form part group belong a set of form parts, which are formed by the combination of suitable raster points. Suitable combined raster points for the numeral "1" are denoted in FIG. 2 in each case by the indicated boundaries, and furthermore the combined raster points are each applied to the respective network, e.g., the raster points 5, 2, 6 and 10 to network $N_1$KL1. This means that the raster points 5, 2, 6 and 10 correspond to a form part of the number 1 and the raster point voltages from the raster points 5, 2, 6 and 10 are combined to produce an output voltage which is characteristic for this form part in the network $N_1$KL1. This is equally applicable for all the other networks. It is understood that in the sections (a), (b), (c) and (d) of the FIG. 2 the same raster field is illustrated in each case, which is merely separated into four pictures for the sake of clarity.

In section (b) of FIG. 2 the form parts are illustrated in which blackenings arise in representatives of number 1. The electrical voltages of the raster point values combined for form parts are led to the networks $N_1$KL1 . . . $N_6$KL1. Corresponding to the illustration of section (b) in FIG. 2, the electrical voltages of the following raster points are applied to the following networks:

| Raster points | Network |
|---|---|
| 5, 2, 6, 10 | $N_1KL1$ |
| 3, 7 | $N_2KL1$ |
| 14, 15, 16 | $N_3KL1$ |
| 18, 19, 20 | $N_4KL1$ |
| 22, 23, 24 | $N_5KL1$ |
| 3, 7, 11, 14, 15, 16, 18, 19, 20, 22, 23, 24 | $N_6KL1$ |

In these networks a classification of the character presented into the class of numeral "1" takes place with reference to the form parts if the blackenings or electrical voltages of the noted form parts lie above a predetermined threshold, indicating that the blackening for classification into the class of numeral "1" is sufficient. For this, the electrical voltages generate in each of the resistance networks $N_1$KL1 . . . $N_6$KL1 an output voltage which lies within the predetermined boundaries for a YES classification. This shows that the form parts of the character presented correspond to the form parts of the numeral "1" which are stored in the networks $N_1$KL1 . . . $N_6$KL1 in the form of resistance circuits. By means of this, the individual raster point combinations or resistance networks sample various form parts.

The electrical voltages led from raster points 5, 2, 6, 10 and 3, 7 to the networks $N_1$KL1 and $N_2$KL1, respectively, determine essentially the boundaries of length, position and inclination of the up-stroke of the numeral "1". The combination of electrical voltages from the raster points 3, 7, 11, 14, 15, 16, 18, 19, 20, 22, 23, 24 determines the down-stroke of the numeral "1." This down-stroke can be both vertical and also somewhat inclined to the right or the left but in each case recognition takes place by the combination of electrical voltages of raster points 14, 15, 16 for network $N_3KL1$, of raster points 18, 19, 20 for the network $N_4KL1$ and of raster points 22, 23, 24 for the network $N_5KL1$.

As noted, the blackenings of the form parts which are set out for the classification must lie above a predetermined boundary, in order that the output voltages of the resistance networks lie below the predetermined boundary for YES classification. In practice however the absolute amount of blackening or the absolute value of the raster point voltage of a form part varies not only with the shape of the character present, but inter alia also from the thickness and colour of the ink with which the character has been printed or written. In order to render the process substantially independent of this, according to the invention all blackenings or electrical voltages from raster points 1–24 for the character present are added together and the sum — is used for determining the appropriate boundary for YES classification. For this, a comparison circuit having an output A is provided to generate a voltage with which the output voltages of the resistance networks are compared, and the magnitude of this comparison voltage is made dependent on the added raster point values in an addition circuit $A_{1-24}$ for electrical voltages of the character present. This is illustrated in section (a) of FIG. 2. Now if, for example, the output of the resistance networks decreases as a result of too little blackening of the representative for classification, (from which a classification error could arise) then because of this addition circuit $A_{1-24}$, the comparison voltage also decreases so that the predetermined boundary for classification remains constant. Preferably, the total voltage of the added raster point values is fed via a regulator $R_s$, which allows adjustment of the voltage to a desired value, especially in test work or in the determination of the predetermined boundaries for classification on the basis of the given print quality of the characters presented.

Figure 3:
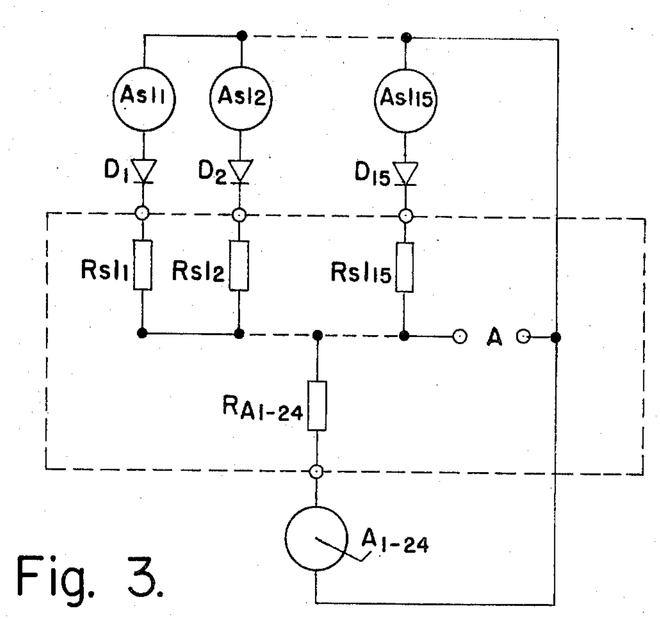
FIG. 3 shows, as an example, a possible construction of a comparison circuit, arranged as a bridge circuit.

FIG. 3 shows, as an example, a possible construction of the comparison circuit V, arranged as a bridge circuit. In the shown circuit output voltage $As1_1$, $As1_2$ . . . $As1_{15}$ of each resistance network $N_1KL1$, $N_2KL1$ . . . $N_{15}KL1$ is compared with the sum of all raster point voltages, i.e., the total voltage formed in the addition circuit $A_{1-24}$. The diodes $D_1$, $D_2$ . . . $D_{15}$ and resistors $Rs1_1$, $Rs1_2$ . . . $Rs1_{15}$ serve for uncoupling of the voltages $As1_1$, $As1_2$ . . . $As1_{15}$. The resistor $RA_{1-24}$ allows to adjust the effective value of the comparison voltage resulting from the sum of all raster point voltages $A_{1-24}$.

For obtaining the output voltages of the networks $N_1KL1$ . . . $N_6KL1$ within the predetermined boundaries for YES classification, these networks can be constructed as bridge circuits in which one bridge arm consists of resistances to which are led the electrical voltages from the raster points associated with the particular form part of the character, while over the other arm of the bridge a voltage is led which is so chosen that the output voltage of the network in question then lies below the predetermined boundary if the chosen raster points of said associated form part produce adequate electrical voltages. Preferably the voltage led via said other bridge arm is likewise derived from the raster point values added to a total voltage, as in the case of the above noted comparison voltage, so that the influence of the printing quality and colour of the characters is further reduced.

Figure 4:
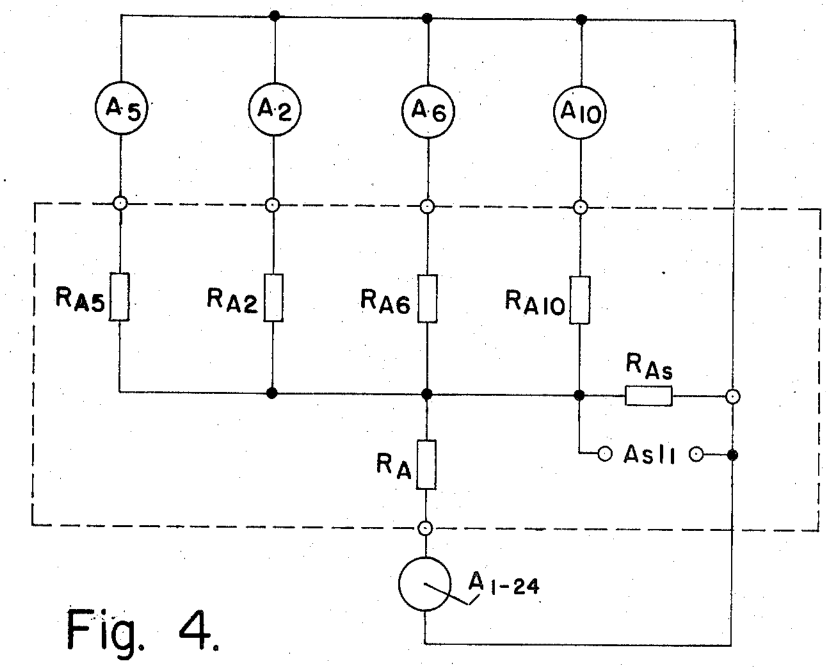
FIG. 4 shows, as an example, a possible construction of a resistance network in the form of a bridge circuit.

FIG. 4 shows, as an example, a possible construction of a resistance network (e.g. $N_1KL1$ in FIG. 2(*b*)) in the form of a bridge circuit. The latter consists of resistors $R_{A5}$, $R_{A2}$, $R_{A6}$ and $R_{A10}$ forming the one bridge arm, and of a resistor $R_A$ forming the other bridge arm. The output voltage $As1_1$ results on resistor $R_{AS}$. With this bridge circuit the sum of the raster point voltages $A_5$, $A_2$, $A_6$ and $A_{10}$ is compared with the sum of all raster point voltages $A_{1-24}$.

The remaining resistance networks according to FIG. 2(*b*) and the resistance networks according to FIG. 2(*c*) and 2(*d*) can be constructed similarly in form of bridge circuits, as the illustrated circuit of the resistance network $N_1KL1$.

In combination with the form parts illustration in section (*b*) of FIG. 2, a classification into the class of numeral "1" can also result if, for example, all raster points were black or a number "7" with very wide strokes were presented for classification. In order to exclude such other misclassifications as could sometimes arise by misprinting, smudging in the case of handwritten characters, or soiling of the underlayer, as well as to distinguish from similar characters, in the present case, for example, the numeral "7" with wide strokes, the raster point combinations given in section (c) of FIG. 2 are used in combination with the resistance networks $N_7KL1$ . . . $N_{12}KL1$. The following voltages are fed into the network:

| Raster points | Network |
|---|---|
| 1, 4, 8 | $N_7KL1$ |
| 9, 13 | $N_8KL1$ |
| 13, 14 | $N_9KL1$ |
| 17, 21 | $N_{10}KL1$ |
| 18, 20 | $N_{11}KL1$ |
| 22, 24 | $N_{12}KL1$ |

While according to the present illustration, the networks $N_1KL1$ . . . $N_6KL1$ are so established that their output voltages lie within the predetermined boundaries for a YES classification when the corresponding raster points have sufficient blackening for a YES classification, that is, in accordance with the instant example, when a numeral "1" is present, the networks $N_7KL1$ . . . $N_{12}KL1$ are established so that their output voltages are only within the predetermined boundaries with light or only slightly darkened raster points, e.g., on the presence of a numeral "1". Conversely, the output voltages of each network lie above the predetermined boundaries if substantial blackening in these raster points arises, for example, if there is present a numeral "7" or if there is complete blackening of all raster points. These networks for numeral "1" thus prohibit a numeral "7" or full blackening of all raster points to be erroneously classified as numeral "1"; thus, these networks provide for NO classification of foreign signs and concurrent characters.

Individually the raster point combinations illustrated have the following actions: the combination of electrical voltages of raster points 1, 4 and 8 in network $N_7KL1$ prevents a character with a horizontal upper stroke, as is given for example by the numeral "7", from being classified as a numeral "1". The combinations of raster points 9 and 13 for the network $N_8KL1$, the raster points 13, 14 for the network $N_9KL1$, the raster points 17, 21 for the network $N_{10}KL1$, the raster points 18, 20 for the network $N_{11}KL1$, and the raster points 22, 24 for the network $N_{12}KL1$ prevent any character with too inclined a down-stroke, such as, for example, the numeral "7", from being classified as a numeral "1" since in these cases a part of the just-mentioned raster points would be blackened and thus the output voltage of some of networks $N_7KL1$ . . . $N_{12}KL1$ would lie above the predetermined boundaries. These networks can however naturally be so arranged that a numeral "1" with a somewhat inclined down-stroke, e.g. as with representative $Rel_1$ in FIG. 1, is classified as a numeral "1."

The form parts of the third form part group are illustrated in the section (d) of FIG. 2. In the case of each form part, raster point combinations are used in which an evaluation takes place according to features of blackening equality both for a YES classification as well as for a NO classification.

By means of the resistance network $N_{13}KL1$, it may be determined whether the blackenings of raster points 2, 6, 10 are the same or similar to the blackenings of raster points 14, 15, 16. With reference to the classification to the class of numeral "1" this means that this requirement is only fulfilled by representatives of numerals "1" and "7" and for all other figures no classification into the class of numeral "1" can result. For determining the blackening equality between the blackenings of raster points 14, 15, 16, on the one hand and the blackenings of raster points 18, 19, 20 on the other hand, network $N_{14}KL1$ is provided in similar fashion as the network $N_{13}KL1$.

The equality requirement between the blackenings of raster points 4 and 8 on the one hand and 12 and 16 on the other hand is determined in network $N_{15}KL1$ such that for all other numbers than numeral "1" a YES classification in the class of numeral "1" will not occur since all numbers apart from numeral "1" in these form parts, i.e., raster combinations, have differing blackenings. Thus, a YES classification for these form parts will not obtain for the numeral "7" which is, in many ways, similar to the features of the numeral "1."

As noted above, networks $N_{13}KL1$, $N_{14}KL1$ and $N_{15}KL1$ are constructed as bridge circuits similar to those circuits in FIGS. 2(*b*) and 2(*c*). Each such bridge circuit will form the difference of voltages from two groups of raster areas to determine the equality of blackness therebetween. For example, if the determination of the blackening of raster points 2, 6, 10 on the one hand is approximately equal to the blackening of raster points 14, 15, 16 as determined by the bridge circuit of resistor network $N_{13}KL1$, a difference voltage of approximately zero will be produced. It will be appreciated, for example, that in comparing voltages representative of groups of raster points, such voltage may be reflected in one arm of a bridge circuit while the other voltage may be reflected in an opposing arm of a bridge circuit similar to the comparison of voltages of the bridge circuits of FIGS. 3 and 4.

In similar fashion characteristic form can be formed for all characters in accordance with the previously defined limitations using black regions of the raster field, regions of the raster field which stay white, and two raster field regions each of the same or substantially the same blackening.

One can thus see that in the process according to the invention the electrical voltages from such raster points which correspond in combination, to characteristic form parts of predetermined characters, are combined to produce an output voltage, wherein each form part has a particular function in the course of recognition of a presented character, whether the form part of the presented character is tested for a blackening condition or lightening condition or a condition of equal blackening. Only when the output voltages of all networks of one class (in the illustrated example the networks $N_1KL1$ . . . $N_{15}KL1$) lie within the boundaries determined for the classification, does a YES classification result.

For practically carrying out the process of the invention it is preferable to enable the output voltages of the resistance networks, and thus the predetermined boundaries for the classification, to be continuously adjustable. For this purpose the output voltages $As1_1$ . . . . $As1_{15}$ of networks $N_1KL1$ . . . $N_{15}KL1$ are applied to regulators $R_1$ . . . $R_{15}$, there being a regulator attached to each network. In general the boundaries of the individual networks of a class, within which the output voltages of the networks must fall for a YES classification, are not the same. With the regulators $R_1$ . . . $R_{15}$ however, these boundaries can be normalised to a predetermined value. As already noted, in the comparison circuit V the output voltages are compared with a voltage which is derived from the added raster point voltages. Without normalisation of the network output voltages a particular comparison voltage is required for each output voltage. By using normalised output voltages which are produced by regulators $R_1$ . . . $R_{15}$, however, the output voltages of the networks require only a single comparison voltage.

With the regulators $R_1$ . . . $R_{15}$ one can also alter the predetermined boundaries for the output voltages for a YES classification even after the resistance networks have been determined or designed. This is advantageous for carrying out the process in clear script readers, since the determination or design of the resistance networks takes place beforehand on the basis of script specimens or character simulations; but when putting the process into actual practice, corrections might be advantageous or necessary. Since the regulators $R_1$ . . . $R_{15}$, and consequently, the regulatable output voltages of the resistance networks, are independent from one another, and the form parts tested and stored in the individual resistance networks for the characters are easily surveyable, this regulation of the output voltages enables a very good and satisfactory matching to the particular conditions encountered in practice.

For simplicity, in the present specification, when referring to the imaging of the character on the raster field, "blackened" or "light-remaining" regions or raster points of the raster field have been referred to. It is understood, however, that the reverse conditions could also be present, since the process in accordance with the invention is equally applicable if the characters presented are dark on a light background or light on a dark background, or whether they are coloured letters and/or a coloured background, so long as a sufficient contrast between the character under investigation and the background is present when the character is imaged onto the raster field. The terminology concerning blackened and light-remaining regions is to be understood therefore, in this general sense.

What is claimed is:

1. A raster process for classifying characters the features of which may vary, into m classes, in which process the characters to be classified are imaged onto a raster field having *n* raster points, from each raster point there is derived an electrical voltage, and the obtained *n* electrical voltages are fed to resistance networks and are used therein for forming combinations, comprising the steps of:

feeding the n electrical voltages derived from the raster points, for each of said classes to no more than *n* mutually independent resistance networks of each class;

combining in each of said resistance networks of a class the electrical voltages derived from a group of predetermined raster points, which together correspond to characteristic form parts of characters of said class, said form parts being selectively comprised of a plurality of predetermined areas of said raster field, said areas comprising darkened areas of said raster field, light-remaining areas of said raster field, and two raster field areas of equal or approximately equal degree of darkening or lightening respectively, with each of said raster areas comprised of two or more raster points, to produce an output voltage at each of said resistance networks of a class;

and determining whether the output voltage of each resistance network is below a threshold level associated with the class to be identified.

2. A process according to claim 1 wherein said step of determining whether the output voltage of each resistance network is below a threshold level associated with the class to be identified, comprises the step of comparing the output voltage of each resistance network with a voltage which is proportional or approximately proportional to the sum of the n electrical voltages derived from the raster points.

3. A process according to claim 2 wherein the output voltage of each resistance network is passed through a regulator.

4. A process according to claim 3 wherein the voltage which is proportional or approximately proportional to the sum of the *n* electrical voltages derived from the raster points is passed through a regulator.

* * * * *

PO-1050
(5/69)

UNITED STATES PATENT OFFICE
CERTIFICATE OF CORRECTION

Patent No. 3,790,955 Dated February 5, 1974

Inventor(s) ARTHUR KLEMT

It is certified that error appears in the above-identified patent and that said Letters Patent are hereby corrected as shown below:

Column 5, line 24, after "about" delete "15"
line 62, "are" (first occurrence) should read --and--;
Column 6, line 5, after "voltages" insert --for each class are, independently of the number of representatives only supplied to at most n resistence networks, wherein all the resistance networks work together for all--
Column 7, line 56, "rastr" should read --raster--;
Column 10, line 32, "$N_3$KL1" should read --$N_8$KL1--;
line 63, "$N_3$KL1" should read --$N_8$KL1--
Column 11, line 57, after "form" insert --parts--.

Signed and sealed this 17th day of September 1974.

(SEAL)
Attest:

McCOY M. GIBSON JR.
Attesting Officer

C. MARSHALL DANN
Commissioner of Patents